United States Patent [19]

Kawa

[11] 4,262,239

[45] Apr. 14, 1981

[54] SERVO MOTOR APPARATUS

[75] Inventor: Ryuichi Kawa, Tokyo, Japan

[73] Assignee: Ricoh Company, Ltd., Tokyo, Japan

[21] Appl. No.: 951,276

[22] Filed: Oct. 13, 1978

[30] Foreign Application Priority Data

Oct. 21, 1977 [JP] Japan .................................. 52-127036

[51] Int. Cl.³ ............................................. G05B 13/00
[52] U.S. Cl. .................................... 318/561; 318/632; 318/685
[58] Field of Search ................. 318/561, 632, 685, 696

[56] References Cited

U.S. PATENT DOCUMENTS

| | | | |
|---|---|---|---|
| 3,836,833 | 9/1974 | Harris et al. | 318/561 |
| 3,952,238 | 4/1976 | Cutler | 318/561 |
| 4,025,837 | 5/1977 | Meier et al. | 318/561 |
| 4,099,113 | 7/1978 | Hayashi | 318/561 |

Primary Examiner—S. J. Witkowski
Assistant Examiner—Eugene S. Indyk
Attorney, Agent, or Firm—David G. Alexander

[57] ABSTRACT

A theoretically optimum motor drive time period or drive pulse width is computed as a function of the number of steps from the present motor shaft step to the desired command step. A compensation time period is computed as a function of a previous motor drive time period and combined with the computed drive time period to produce a present drive time period for energization of the motor (12) for movement of the motor shaft (14) from the present step to the next step.

10 Claims, 11 Drawing Figures

SERVO MOTOR APPARATUS

BACKGROUND OF THE INVENTION

The present invention relates to a servo motor apparatus for a printer, facsimile transceiver or the like. In such an apparatus a theoretically optimum rotational speed of a motor shaft is calculated as a function of the angular distance of the motor shaft from the present step or position to the new desired command step or position. A speed sensor connected to the motor shaft produces pulses corresponding in period to the actual motor shaft speed. The theoretical and actual speeds are compared to produce a speed difference signal which is in turn used to calculate a drive pulse time period or pulse width for energizing the motor for movement from the present step to the next step. The theoretical speed is progressively reduced as the motor shaft approaches the command position. The motor may be energized in the forward or reverse directions depending on whether the actual speed is lower or higher than the theoretical speed respectively.

However, such an apparatus as developed heretofore operates erroneously due to the inertia of the motor shaft and the load which it drives, especially when the load is variable. This is because the motor shaft does not respond immediately to changes in drive energy and the instantaneous motor shaft speed does not reflect the drive energy applied during the previous motor step. This phenomenon causes overshooting, undershooting and oscillation which are detrimental to the accurate positioning of the motor shaft. For example, application of a large amount of drive energy will not immediately speed up the motor shaft due to mechanical inertia. During the next step the difference between the theoretical speed and the actual speed will still be very large and an excessive amount of drive energy will be applied to the motor. This will cause the motor to accelerate at an excessive rate and overshoot the theoretical speed. The same phenomenon will occur as the speed decreases toward the theoretical speed after overshooting and will result in undershooting. A large amount of oscillation will occur throughout the movement of the motor shaft for this reason.

SUMMARY OF THE INVENTION

A servo motor apparatus embodying the present invention includes a servo motor, input means for indicating a number of steps from a present motor shaft step to a command motor shaft step, first computing means for computing a computed drive time period for energization of the motor for movement from the present motor shaft step to a next motor shaft step as a first predetermined function of the number of steps and drive means for energizing the motor for a present drive time period. Second computing means compute a compensation time period as a second predetermined function of a previous drive time period. Third computing means combine the computed drive time period with the compensation time period in accordance with a third predetermined function to produce the present drive time period.

It is an object of the present invention to provide a servo motor apparatus which accurately positions a motor shaft regardless of the mechanical inertia of the shaft and the load which it drives.

It is another object of the present invention to provide a servo motor apparatus which eliminates overshooting, undershooting and oscillation during operation thereof.

It is another object of the present invention to provide a servo motor apparatus which can be produced efficiently and economically on a commercial production basis.

It is another object of the present invention to provide a generally improved servo motor apparatus.

Other objects, together with the following, are attained in the embodiment described in the following description and shown in the accompanying drawing.

DESCRIPTION OF THE PREFERRED EMBODIMENT

While the servo motor apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
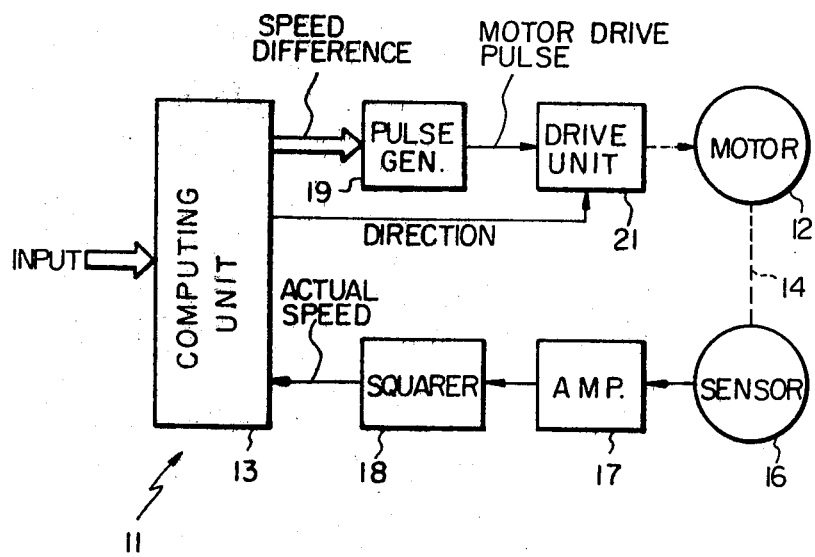
FIG. 1 is a block diagram of a servo motor apparatus to which the present invention relates.

Referring now to FIG. 1 of the drawing, a servo motor apparatus constituting a closed loop servo motor control system is generally designated by the reference numeral 11 and comprises a servo motor 12. An electrical input signal preferably binary, is fed to a computing unit 13 indicating the number of steps and direction of rotation from a present motor shaft position or step to a desired command position or step. For example, the input signal may indicate clockwise rotation of a shaft 14 of the motor 12 for twelve steps.

The computing unit 13 computes a theoretically optimum command speed at which the motor shaft 14 should be rotating. A sensor 16 connected to the motor shaft 14 produces a signal indicating the actual speed of rotation of the motor shaft 14 which is passed through an amplifier 17 and squarer 18 to the computing unit 13. The computing unit 13 subtracts the actual speed from the command speed to produce a speed difference signal which is fed to a pulse generator 19. The pulse generator 19 produces a motor drive pulse for each step having a time period corresponding to the magnitude of the difference signal. Since the difference signal constantly changes, the time periods or pulse widths of the drive pulses change correspondingly. A direction signal is also produced by the computing unit 13 which is fed to a motor drive unit 21 along with the drive pulses. The direction signal indicates whether the motor 12 is to be energized for rotation in the forward (clockwise) or reverse (counterclockwise) direction. The direction signal is binary having a logically high or low value for forward or reverse energization respectively.

When the motor shaft speed is lower than the command speed, the direction signal will cause the motor 12 to be energized so as to urge the motor shaft 14 to continue rotating in the same direction. The greater the difference between the actual speed and the command speed the greater the drive pulse width and the longer the time period the motor 12 is energized.

When the motor shaft speed is higher than the command speed, the direction signal causes the motor 12 to be energized so as to urge the motor shaft 14 to rotate in the opposite direction. In other words, a reverse energization is applied to the motor 12 to brake or decelerate the motor shaft 14.

The basic apparatus 11 of FIG. 1 without the improvement of the present invention suffers from the problems of overshooting, undershooting and oscillation discussed above due to the inertia of the motor shaft 14 and a load (not shown) which is driven by the motor shaft 14 and which changes constantly.

Figure 2:
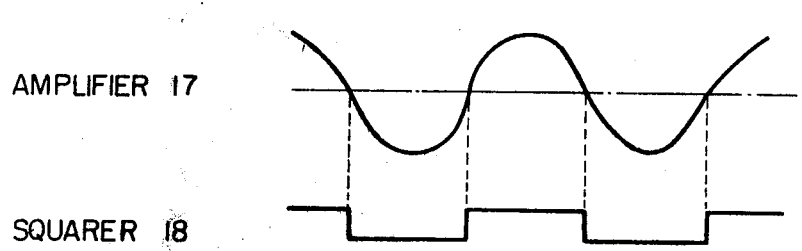
FIG. 2 is a timing diagram illustrating the operation of the apparatus.

The sensor 16 may be a tachometer, photoelectronic generator or any other type of known speed sensor which is driven by the motor shaft 14 and produces a sinusoidal output having a frequency proportional to the motor shaft speed. The outputs of the sensor 17 and squarer 18 are shown in FIG. 2.

Figure 3:
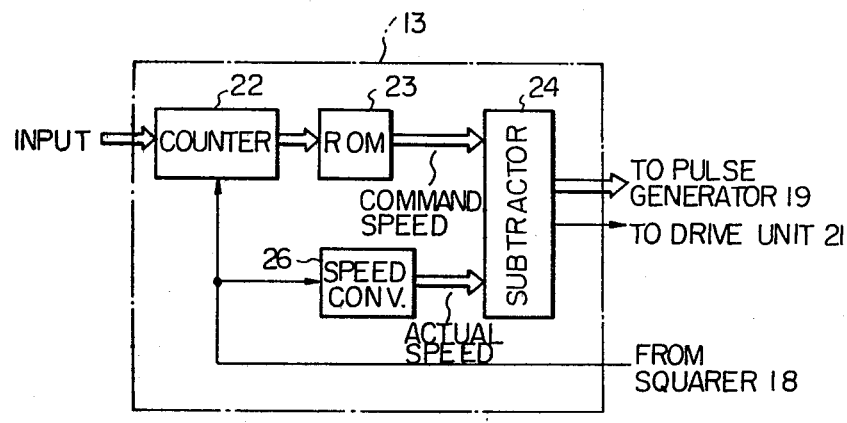
FIG. 3 is a block diagram of a first computing unit of the apparatus.

As best seen in FIG. 3, computing unit 13 comprises a counter 22 which is initially set by the input signal and which is decremented by the output signals of the squarer 18. Preferably, the speed sensor 16 and thereby the squarer 18 will produce one pulse for each motor shaft step. For example, if the input signal indicates that the motor shaft 14 should rotate from the present step twelve steps clockwise to a desired command step, the counter 22 will be initially set to binary twelve (1100).

The output of the counter 22 is fed to a read-only memory (ROM) 23 as an address input. The output of the ROM 23 is constituted by the contents of the addressed memory location. The data stored in the ROM 23 corresponds to the theoretically optimum rotational speed of the motor shaft 14 at the present step position assuming that the motor shaft 14 must rotate through the number of steps stored in the counter 22. The output of the ROM 23 is fed to an input of a subtractor 24.

The output of the squarer 18 is also applied to an input of a speed converter 26 which produces a signal at the same scale factor as the ROM 23 indicating the actual motor shaft speed. It will be understood that the output of the ROM 23 indicates the command speed. The subtractor 24 subtracts the actual speed from the command speed and produces the signal which is fed to the pulse generator 19 indicating the absolute value or magnitude of the speed difference. The direction signal corresponds to the sign of the difference signal and is fed to the drive unit 21. The pulse generator 19 produces a pulse corresponding in period or duration to the magnitude of the difference signal which is applied to the motor 12 through the drive unit 21 causing the motor shaft 14 to rotate to the next step.

Figure 4:
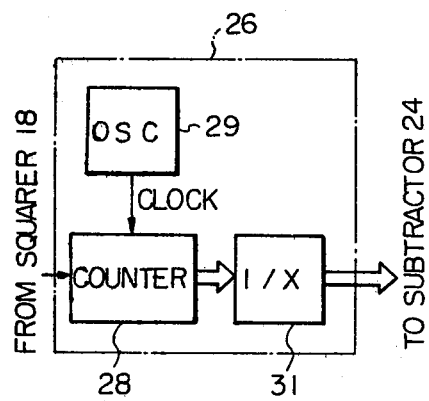
FIG. 4 is a block diagram of a speed converter of the apparatus.

The speed converter 26 is shown in FIG. 4 as comprising a counter 28 which is initially reset to zero. The pulses from the squarer 18 are applied to the count enable input of the counter 28. Clock pulses from an oscillator 29 are applied to the count input of the counter 28 and cause the counter 28 to increment. The counter 28 is enabled for the duration of the positive portion of each output pulse of the squarer 18 which corresponds to one-half cycle of the corresponding output signal of the speed sensor 16. For example, if the speed sensor 16 produces sinusoidal signals at a repetition period of two milliseconds, the counter 28 will be enabled for 1 millisecond per signal.

The count accumulated in the counter 28 per half cycle of one output cycle of the sensor 16 is proportional to the duration or time period of the half cycle and inversely proportional to the frequency of the sinusoidal signals. Therefore, the count in the counter 28 is inversely proportional to the speed of rotation of the motor shaft 14. This count is applied to a reciprocal circuit 31 which produces the reciprocal of the count. This reciprocal signal constitutes the actual speed signal.

Figure 5:
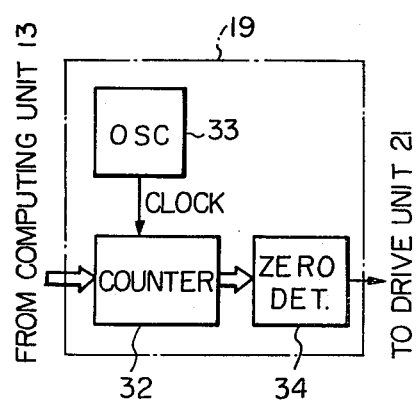
FIG. 5 is a block diagram of a pulse generator of the apparatus.

The pulse generator 19 is shown in FIG. 5 as comprising a counter 32 which is initially set to a count equal to the difference signal from the subtractor 24. Clock pulses from an oscillator 33 are applied to the count input of the counter 32 causing the counter 32 to decrement. A zero detector 34 is connected to the output of the counter 32 and produces a high output constituting a motor drive pulse as long as the count in the counter 32 is not zero. Thus, the time period the output of the zero detector 34 remains high is proportional to the magnitude of the difference signal.

Figure 6:
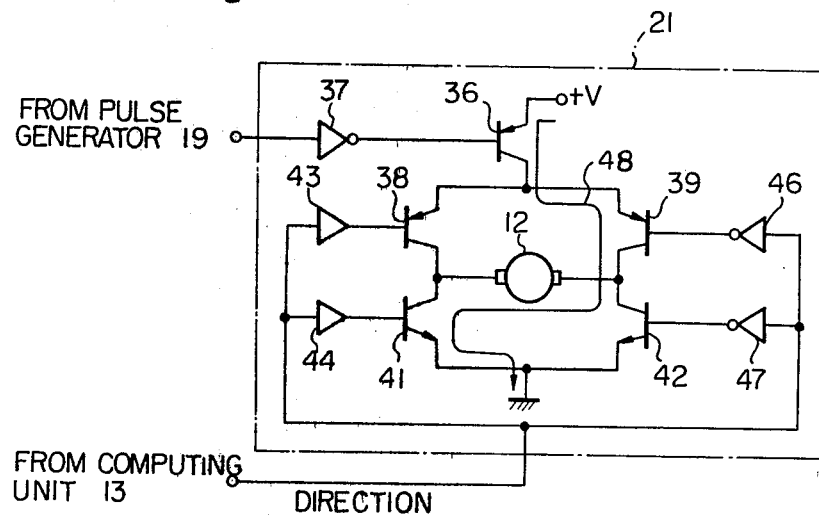
FIG. 6 is an electrical schematic diagram of a servo motor and drive unit of the apparatus.

The motor drive unit 21 is illustrated in FIG. 6 and comprises a power switch transistor 36 of the PNP type. The output of the pulse generator 19 is applied through an inverter 37 to the base of the transistor 36. The emitter of the transistor 36 is connected to a positive D.C. power source +V. The collector of the transistor 36 is connected to the emitters of PNP driver transistors 38 and 39. The collectors of the transistors 38 and 39 are connected to the opposite terminals of the motor 12 respectively.

The emitters of NPN driver transistors 41 and 42 are grounded and the collectors thereof are connected to the collectors of the transistors 38 and 39 respectively. The direction signal from the computing unit 13 is applied through amplifiers 43 and 44 to the bases of the transistors 38 and 41 and through inverting amplifiers 46 and 47 to the bases of the transistors 39 and 42 respectively.

The transistor 36 is turned on to apply the voltage of the source +V to the transistors 38 and 39 when the output of the pulse generator 19 is high due to the action of the inverter 37. If the direction signal from the output of the computing unit 13 is high the transistors 39 and 41 will be turned on to pass current through the motor 12 as indicated by an arrow 48 in one direction. If the direction signal is low the transistors 38 and 42 are turned on to pass current through the motor 12 in the opposite direction. It will be seen that the transistors 38, 39, 41 and 42 are arranged in a bridge configuration.

Figure 7:
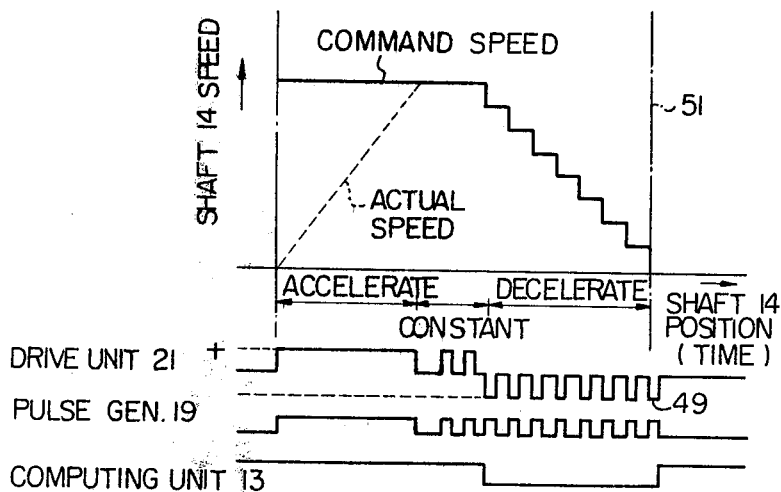
FIG. 7 is another timing diagram illustrating the operation of the apparatus.

FIG. 7 illustrates the basic operation of the apparatus 11. The command speed is indicated by a solid line curve in the upper portion of the drawing. The actual motor shaft speed is indicated by a broken line curve. Further illustrated below the speed curve portion of the drawing are the corresponding drive pulses applied to the motor 12 from the drive unit 21, the drive pulses appearing at the output of the pulse generator 19 and the corresponding direction signal appearing at the output of the computing unit 13.

The actual speed curve consists of three sections. In the first section the motor shaft 14 accelerates up to the command speed. In the second section the motor shaft speed is held constant at the command speed. In the third section the motor shaft speed is decelerated to zero. A reverse (in this case negative) drive pulse 49 is applied to the motor 12 at a step 51 one step prior to the final or command step to brake the shaft 14 to a stop at the command step.

Figure 8:
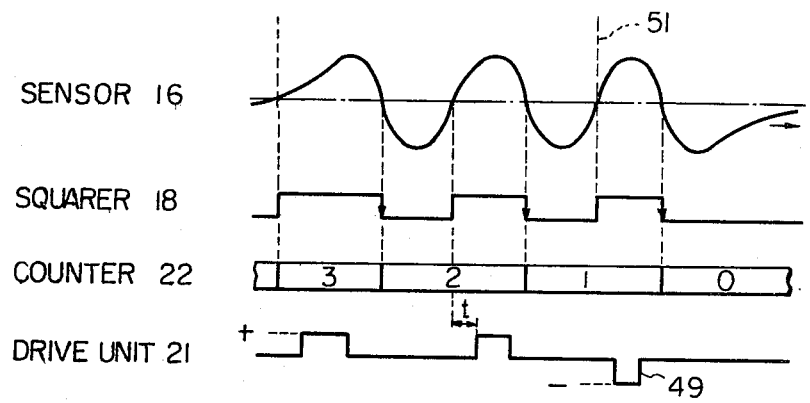
FIG. 8 is another timing diagram illustrating the operation of the apparatus.

FIG. 8 illustrates the operation of the apparatus 11 for movement of three steps. The initial count of three is set into the counter 22, which is decremented by the trailing edges of the output pulses of the squarer 18. The drive pulses are generated by the pulse generator 19 in response to the leading edges of the pulses from the squarer 18. A delay time t is required for computation of the speed difference and setting the output of the subtractor 24 into the counter 32 of the pulse generator 19. Thus, the drive pulses are generated after the time delay t following the leading edges of the respective pulses from the squarer 18.

Figure 9:
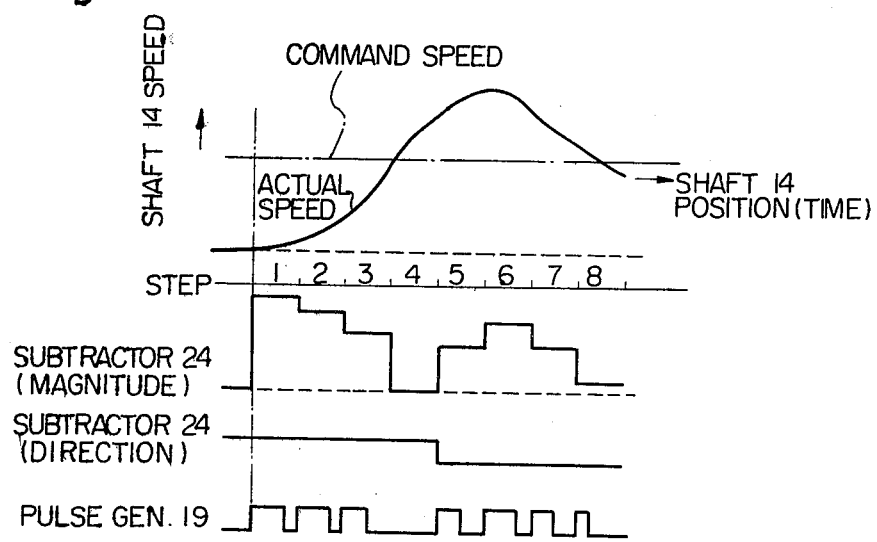
FIG. 9 is a timing diagram illustrating the erroneous operation of the prior art.

FIG. 9 shows how the apparatus 11 operates erroneously without the improvement of the present invention. At the beginning of the first step when the speed difference is computed, the actual motor shaft speed is zero. Therefore, the speed difference is equal to the command speed and the drive pulse duration is large. Therefore, the motor shaft 14 is accelerated at a very high rate. During the second and third steps, due to the mechanical inertia of the shaft 14 and load, the shaft speed is still rather low and a large amount of drive power is applied to the motor 12. The resulting high rate of acceleration causes the actual shaft speed to equal the command speed at the end of the third step. During the fourth step the actual shaft speed overshoots the command speed even though no drive energy is applied. Reverse energization is applied to the motor 12 during the fifth step causing the shaft acceleration to be reduced to zero. Further reverse energization is applied to the motor 12 during the sixth and seventh steps which decelerate the shaft 14 and cause speed to undershoot the command speed during the eighth step. Oscillation will continue about the command speed for a number of further steps although the magnitude of the oscillation will progressively decrease. This overshooting, undershooting and oscillation causes erroneous positioning of the motor shaft 14 and results in an inaccurate servo control system.

Figure 10:
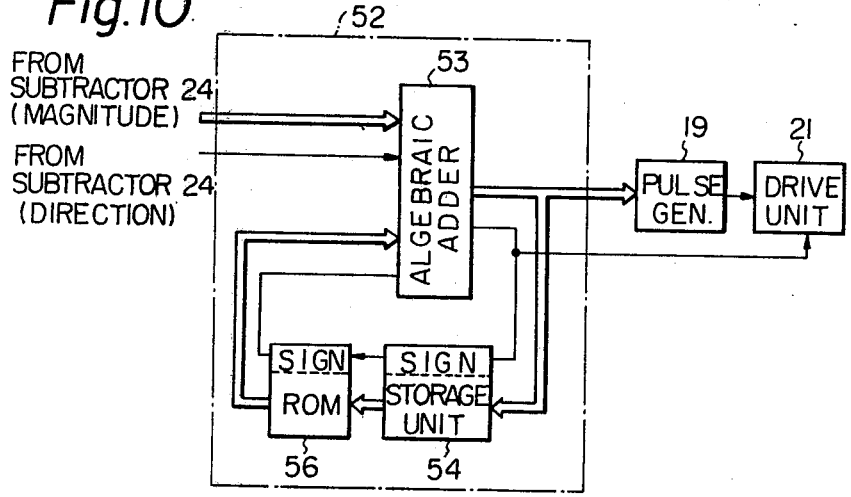
FIG. 10 is a block diagram illustrating second and third computing means and storage means constituting improvement in accordance with the present invention.

These problems are overcome in accordance with the present invention by means of a compensation unit 52 which is disposed between the subtractor 24 of the computing unit 13 and the pulse generator 19 and drive unit 21. The magnitude and direction of the computed speed difference signal from the subtractor 24 are applied to an input of an algebraic adder 53, as shown in FIG. 10. The magnitude output of the adder 53 is connected to inputs of the pulse generator 19 and a storage unit 54. The output of the storage unit 54 is connected to an address input of a read-only memory (ROM) 56, the data output of which is connected to another input of the adder 53. The adder 53, storage unit 54 and ROM 56 are each capable of indicating the sign (positive or negative) of the numbers stored therein.

The storage unit 54 may be a register, a delay unit or any other known means for temporarily storing the speed difference signal for a previous step or plurality of steps. The previous step may be several steps prior to the present step, but will be assumed for purposes of example to be the immediately previous step. It will be further assumed that the storage unit 54 comprises a register for storing the previous speed difference signal. Since the time period of each drive pulse applied to the motor 12 is proportional to the magnitude of the speed difference signal, it will be understood by all those skilled in the art that alteration of the speed difference signal is equivalent to alteration of the time period of the corresponding motor drive pulse.

The magnitude and sign (indicating motor energization direction) of the speed difference signal for the previous step is stored in the storage unit 54 and applied to the ROM 56 as an address input during the present step. The ROM 56 produces at its output a compensation speed difference signal stored in the addressed memory location in the ROM 56. This compensation speed difference signal is algebraically combined with or added to the present computed speed difference signal from the subtractor 24 to produce a present speed difference signal. The present speed difference signal, which is the algebraic sum of the compensation speed difference signal and the computed speed difference signal from the subtractor 24 is fed to the pulse generator 19 as the present speed difference signal which is used to produce the present drive pulse time period or pulse width.

In order to reduce overshooting and undershooting due to the inertia of the motor shaft 14 and load, it is desirable that the compensation speed difference signal be of a smaller magnitude than and of opposite direction to the previous speed difference signal. Thus, the data in the ROM 56 is preferably selected to be opposite in sign to the signal applied thereto from the storage unit 54.

Figure 11:
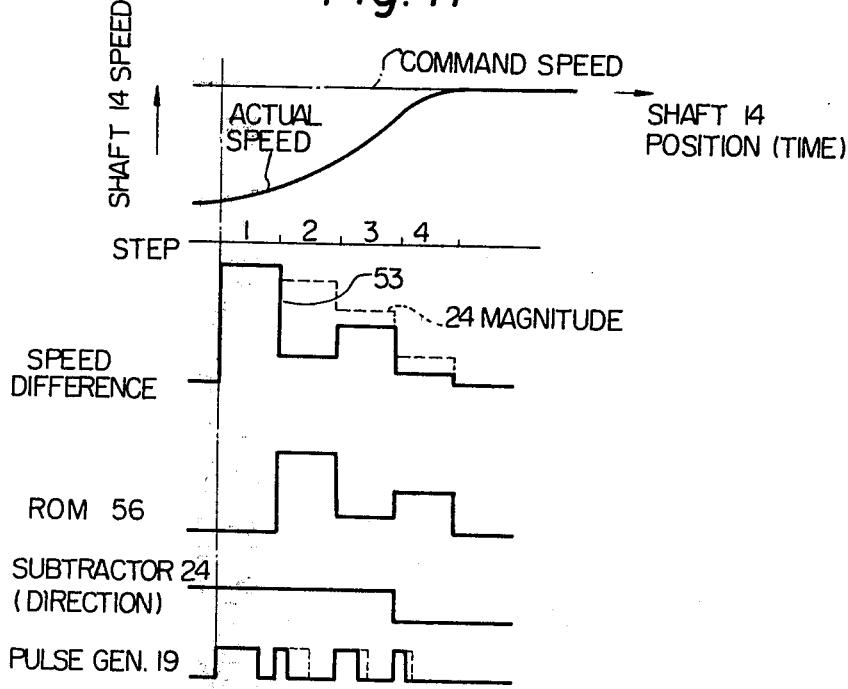
FIG. 11 is a timing diagram illustrating the improved operation provided by the present invention.

FIG. 11 illustrates the operation of the compensation unit 52 where the ROM 56 functions to multiply the output of the storage unit 54. It will be noted that this operation may be broken down into two separate operations of multiplication and sign changing respectively. In accordance with the present invention the motor shaft 14 is stably accelerated to the command speed in only four steps without overshooting or undershooting.

The solid line curve in the speed difference section of FIG. 11 illustrates the output of the adder 53. For comparison, the output of the subtractor 24 which constitutes the speed difference signal without the improvement of the present invention is illustrated in broken line. It will be noted that the compensation unit 52 serves to substantially reduce the speed difference during the second, third and fourth steps to prevent overshooting. Reverse energization is applied in the fourth step whereas no energization is applied in the prior art. The speed difference is unchanged during the first step since the contents of the storage unit 54 are zero.

The output of the pulse generator 19 is also illustrated in FIG. 11. The solid line curve illustrates the motor drive time periods or pulse durations in accordance with the present invention. The uncompensated time periods of the prior art are shown in broken line for purposes of comparison. It will be seen that the time periods are substantially reduced in accordance with the present invention.

It will be noted that the ROM 56 may provide any predetermined function, such as a non-linear function, of the previous speed difference. In a case where the previous speed difference is to be multiplied by a constant, the ROM 56 may be replaced by a multiplier. The particular function which is selected is preferably determined empirically based on the particular inertia and other parameters of the apparatus 11 and load. Also, the adder 53 may be replaced by another computing means operative to combine the computed speed difference with the compensation speed difference in accordance with a function other than algebraic addition.

Again it will be emphasized that alteration of the speed difference signal is equivalent to alteration of the drive time period since the speed difference is set into the counter 32 of the pulse generator 19 for decrementation and the time period of the drive pulse is proportional to the initial count in the counter 32. It is therefore within the scope of the present invention to provide compensation means between the pulse generator 19 and the drive unit 21 which produce the same results as the compensation unit 52 by compensating the drive pulse time periods directly. Equivalent results may also be obtained by adapting the pulse generator 19 to comprise compensation means for altering the initial count in the counter 32 in accordance with a compensation value or to compare the count in the counter 32 with a compensation value and terminate the drive pulse when the counter 32 is decremented to the compensation value.

In summary, it will be seen that the present invention provides an improved servo motor apparatus which eliminates overshooting, undershooting and oscillation and therefore operates in a much more stable and accurate manner than comparable servo motor apparatus known heretofore. Various modifications in addition to those presented hereinabove will become possible for those skilled in the art after receiving the teachings of the present disclosure without departing from the scope thereof.

What is claimed is:

1. A servo motor apparatus including a servo motor, input means for indicating a number of steps from a present motor shaft step to a command motor shaft step, first computing means for computing a computed drive time period for energization of the motor for movement from the present motor shaft step to a next motor shaft step as a first predetermined function of the number of steps and drive means for energizing the motor for a present drive time period, characterized by comprising:
    second computing means for computing a compensation time period as a second predetermined function of a previous drive time period; and
    third computing means for combining the computed drive time period with the compensation time period in accordance with a third predetermined function to produce the present drive time period;
    the previous drive time period corresponding to a difference between a command motor shaft speed and an actual motor shaft speed for a previous step.

2. An apparatus as in claim 1, in which the second predetermined function comprises multiplication.

3. An apparatus as in claim 1, in which the third predetermined function comprises algebraic addition.

4. An apparatus as in claim 1, in which the second predetermined function comprises sign changing.

5. An apparatus as in claim 1, in which the second computing means comprises a read-only memory.

6. An apparatus as in claim 1, in which the previous drive time period corresponds to movement from a preceding motor shaft step to the present motor shaft step.

7. An apparatus as in claim 1, in which the drive means is operative to energize the motor for shaft rotation in either direction, the first, second and third computing means being constructed to indicate respective directions of rotation.

8. An apparatus as in claim 1, further comprising storage means for storing the previous drive time period.

9. An apparatus as in claim 8, in which the storage means comprises a register.

10. An apparatus as in claim 8, in which the storage means comprises delay means for temporarily storing the previous drive time period during passage therethrough.

* * * * *